United States Patent [19]

Muranoi

[11] Patent Number: 5,369,747
[45] Date of Patent: Nov. 29, 1994

[54] INPUT/OUTPUT CHANNEL APPARATUS

[75] Inventor: Takeshi Muranoi, Kanagawa, Japan

[73] Assignee: Mitsubishi Denki Kabushiki Kaisha, Tokyo, Japan

[21] Appl. No.: 917,807

[22] Filed: Jul. 20, 1992

Related U.S. Application Data

[63] Continuation of Ser. No. 429,059, Oct. 30, 1989, abandoned.

[30] Foreign Application Priority Data

Nov. 9, 1988 [JP] Japan .................... 63-283270

[51] Int. Cl.$^5$ .................................................. G06F 3/00
[52] U.S. Cl. .................... 395/250; 364/239.1; 364/241.9; 364/241.4; 364/238.3; 364/DIG. 1
[58] Field of Search .................... 395/650, 700

[56] References Cited

U.S. PATENT DOCUMENTS

| | | | |
|---|---|---|---|
| 4,272,815 | 6/1981 | Kadawaki et al. | 364/200 |
| 4,841,475 | 6/1989 | Ishizuka | 364/900 |
| 4,855,900 | 8/1989 | Simpson et al. | 364/200 |
| 4,866,609 | 9/1989 | Calta et al. | 364/200 |
| 4,985,784 | 1/1991 | Tsuboi et al. | 358/342 |

FOREIGN PATENT DOCUMENTS

| | | | |
|---|---|---|---|
| 0247317 | 6/1987 | European Pat. Off. | |
| 1139042 | 1/1969 | United Kingdom | G06F 3/00 |
| 1591054 | 6/1981 | United Kingdom | G11B 5/09 |

Primary Examiner—Gareth D. Shaw
Assistant Examiner—Johne Q. Chavis
Attorney, Agent, or Firm—Wolf, Greenfield & Sacks

[57] ABSTRACT

An input/output channel apparatus includes a channel processing section and plural channel units transfers data between a main memory and peripheral devices in an electronic computer system. The data transfer speed is directly controlled by the data transfer speed changing mechanism in each channel unit in accordance with the operating condition of the data buffer. Further, the priority of the data chaining process is changed in accordance with the amount of data stored in the data buffer.

4 Claims, 11 Drawing Sheets

INPUT/OUTPUT CHANNEL APPARATUS

This application is a continuation of application Ser. No. 07/429,059 Oct. 30, 1989, now abandoned.

BACKGROUND OF THE INVENTION

1. Field of the Invention

The present invention relates to an input/output channel apparatus for executing the input/output operations between a main memory device and an input/output apparatus in an electronic computer.

2. Description of the Prior Art

Figure 7:
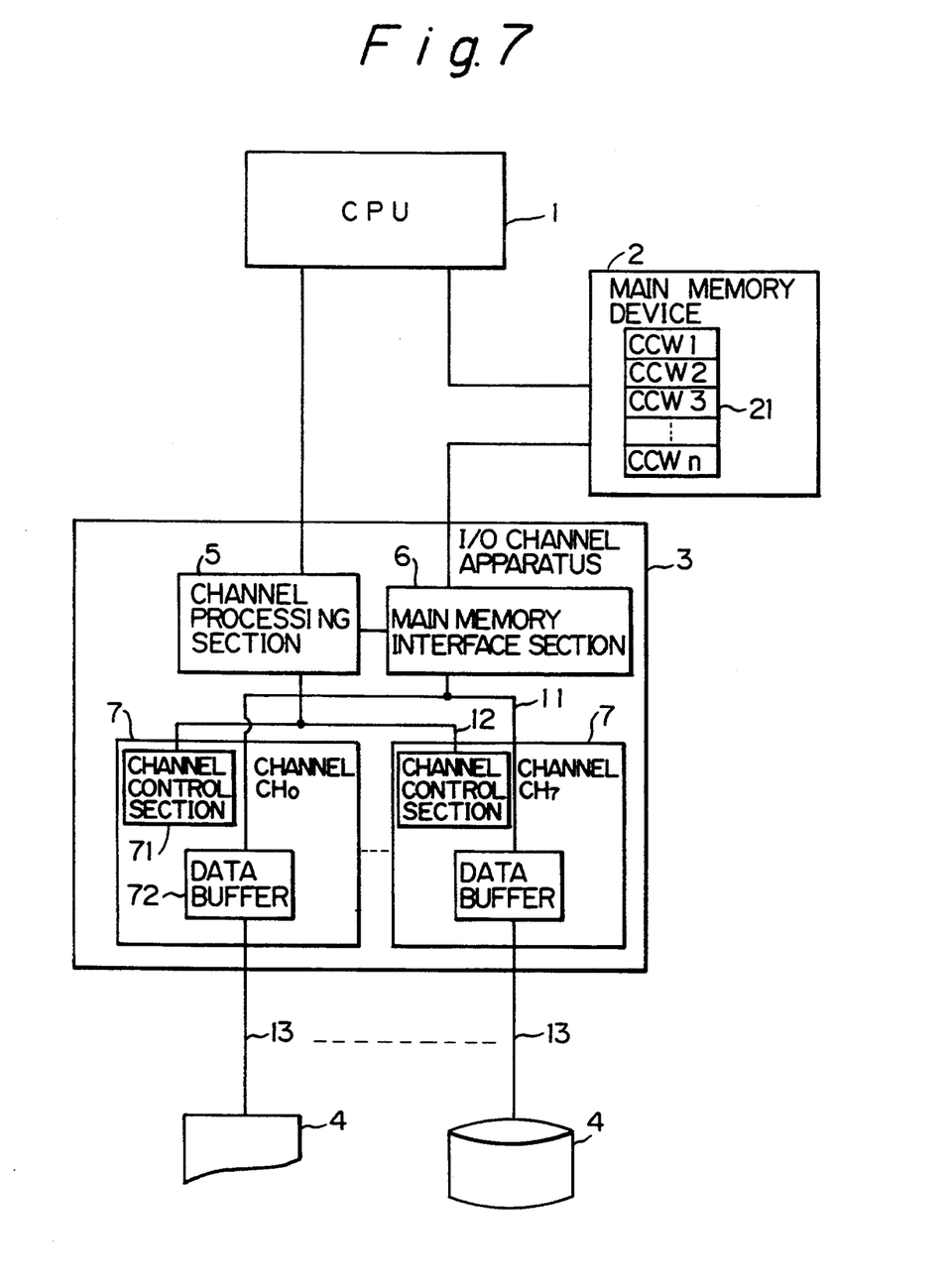
FIG. 7 is a block constructional view of a conventional input/output channel apparatus.

FIG. 7 is a diagram showing an example of a conventional input/output channel apparatus. In the diagram, reference numeral 1 denotes a central processing unit (CPU) to control the arithmetic operation processing operation of the whole apparatus; 2 indicates a main memory device to store data of the CPU 1; 3 an input/output channel apparatus to control the input/output to/from the CPU 1; 4 external input/output apparatuses which are connected to the CPU 1; 5 a channel processing section to process an input and an output of each channel of the input/output channel apparatus 3; 6 a main memory interface section to adjust signals front the main memory device 2 to the input/output channel apparatus 3; 7 channels $CH_0$ to $CH_7$ which are provided in correspondence with the input/output apparatuses 4; channel control sections 71 of the channels $CH_0$ to $CH_7$ (7); 72 data buffers of the channels $CH_0$ to $CH_7$ (7); 21 a CCW list of channel command words (hereinafter, referred to as CCW) which are prepared in the main memory device 2; 11 data buses connecting the main memory interface section 6 and the data buffers 72 of the channels $CH_0$ to $CH_7$ (7); 12 control buses connecting the channel processing section 5 and the channel control sections 71 of the channels $CH_0$ to $CH_7$ (7); and 13 input/output interfaces connecting the data buffers 72 of the channels $CH_0$ to $CH_7$ (7) and the input/output apparatuses 4.

Figure 8:
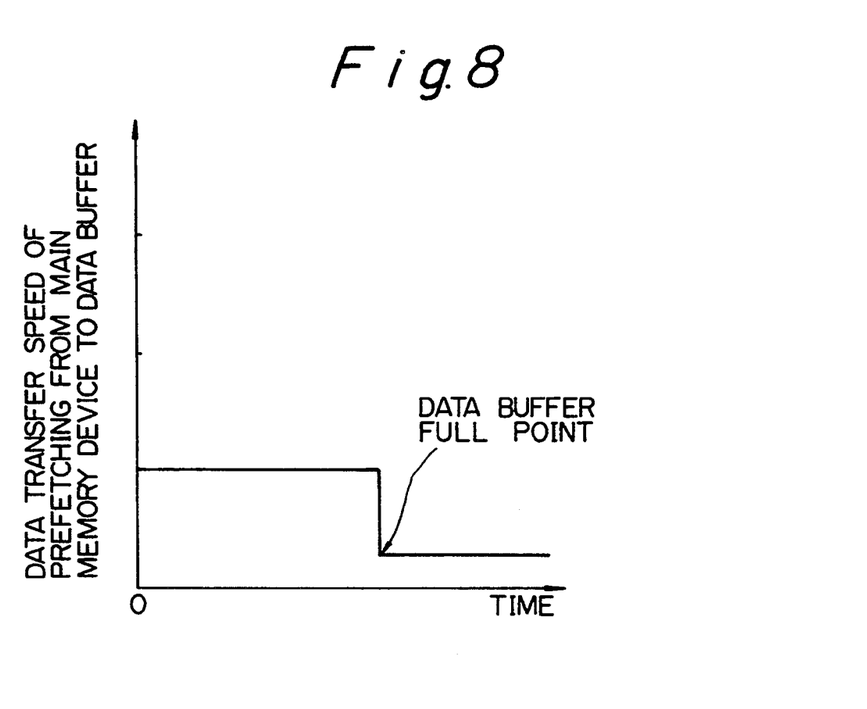
FIG. 8 is a graph showing the transfer speed to time characteristics of the conventional apparatus.
Figure 9:
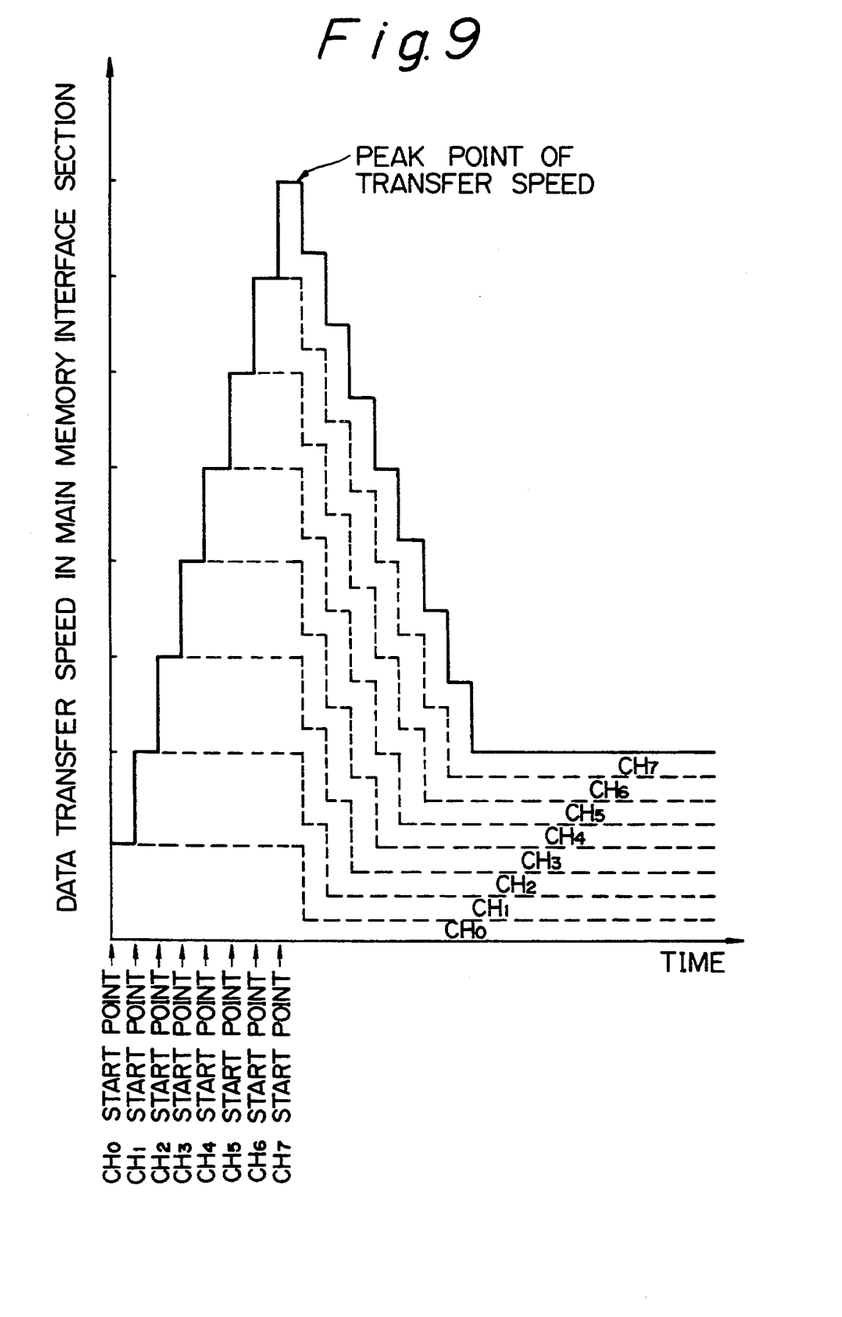
FIG. 9 is a graph showing the transfer speed to time characteristics of the conventional apparatus.

The operation of the conventional input/output channel apparatus based on the above construction will now be described with reference to FIGS. 8 and 9. FIG. 8 is a graph showing the transfer speed to time characteristics with respect to the data transfer speed control in prefetching from the main memory device 2 to the data buffers in the conventional apparatus. FIG. 9 is a graph showing the transfer speed to time characteristics of the data transfer speed (a solid line indicates a total data transfer speed and a broken line represents a transfer speed in every channel) in the main memory interface section in time conventional apparatus.

In the diagrams, an input/output start command is first supplied from the CPU 1 to the channel processing section 5. The channel processing section 5 selects the channels $CH_i$ (i=0 to 7) 7 on the basis of a channel address designated by the I/O start command. The channel processing section 5 generates the input/output command designated by the I/O start command to the corresponding I/O apparatus 4 through the I/O interface 13 of the channel $CH_i$ 7 on the basis of the I/O address designated by the I/O start command.

A write command will now be considered as an I/O command. Next, the channel processing section 5 requests for prefetching of write data to the channel $CH_i$ 7. Then, the channel $CH_i$ 7 starts prefetching the data into the data buffer 72 from the main memory device 2 through the main memory interface section 6. The data prefetched in the data buffer 72 is transferred to the corresponding I/O apparatus 4 through the I/O interface 13 of the channel $CH_i$ 7.

When the data to be written is prefetched, as shown in FIG. 8, it is prefetched at the maximum transfer speed from the main memory device 2 until the data buffer 72 is filled with the data and, after the data buffer 72 has been filled with the data, the data is continuously prefetched at the same transfer speed as that between the data buffer 72 and the I/O apparatus 4.

When the I/O start commands are successively inputted to all of the channels $CH_0$ to $CH_7$ (7) and each channel $CH_i$ 7 has completely prefetched the data to be written as shown in FIG. 8, the data transfer speed in the main memory interface section 6 increases until the total value (the peak point of the transfer speed in the diagram) of the maximum transfer speeds of the prefetching of the channels $CH_i$ 7 as shown in FIG. 9.

The operation In the case where the above conventional I/O channel apparatus executes the data chaining process will now be described with reference to FIGS. 10 to 12.

Figure 10:
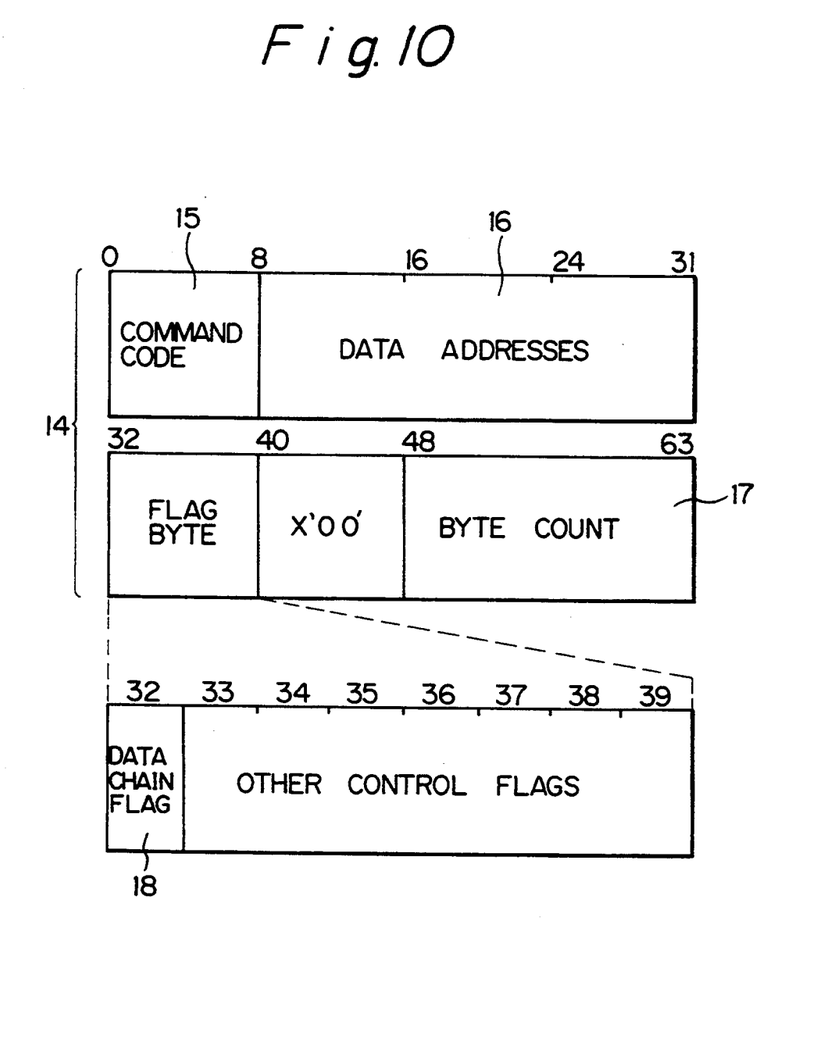
FIG. 10 is a state diagram showing an example of channel command words.

FIG. 10 is a CCW list state diagram showing an example of the CCW list 21. In the diagram, reference numeral 14 denotes a CCW comprising two words; 15 indicates a command code indicative of the reading or writing operation; 16 a data address indicative of a start address of data transfer; 17 a byte count indicative of the number of bytes to be transferred; and 18 a data chain flag in a flag byte provided to indicate a data chain command. FIG. 11 is a flowchart showing all example of a processing flow of the data chain which Is executed by the channel control section 8.

Figure 12:
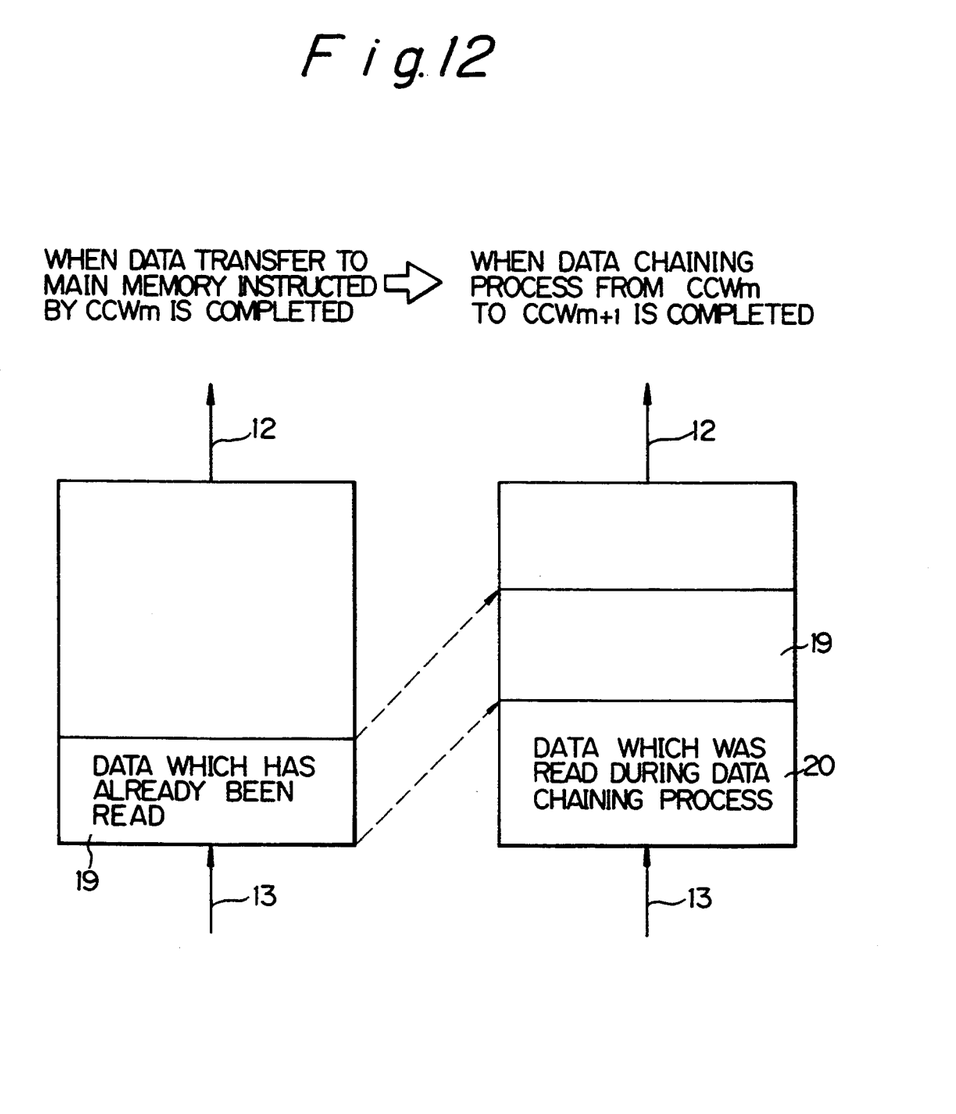
FIG. 12 is a state diagram showing a change in data amount in a data buffer before and after the data chain.

FIG. 12 is a data buffer storage state diagram showing the steps in which the data which was read out of the I/O apparatus 4 is stored into the data buffer 72 before and after the data chain. In the diagram, reference numeral 19 denotes data which had already been read out of the I/O apparatus 4 by the channel control section 71 when the data transfer to the main memory device 2 which was indicated by a $CCW_m$ has been all completed. Reference numeral 20 indicates data which was read out of the I/O apparatus 4 for the period of time when the channel control section 71 executes the data chaining process from the $CCW_m$ to $CCW_{m+1}$.

In the diagrams, the CPU 1 prepares the CCW list 21 in the main memory device 2 and generates the input/output start command (hereinafter, referred to as START I/O) to the channel processing section 5. Thus, the channel processing section 5 reads the head $CCW_1$ from the CCW list 21 in the main memory device 2 via the main memory interface section 6. Next, the channel processing section 5 selects the channel $CH_i$ (i=0 to 7) 7 designated by the START I/O and sends the $CCW_1$ to the channel control section 71 of the same channel $CH_i$ 7 via the control bus 12. Then, the channel control section 71 supplies the command code 15 (refer to FIG. 10) in the $CCW_1$ to the I/O apparatus 4 designated by the START I/O. A read command, that is, a data transfer command from the I/O apparatus 4 to the main memory device 2 is now considered as the command code.

The activated I/O apparatus 4 transfers the read data to the channel $CH_i$ 7 through the I/O interface 13. The channel control section 71 of the same channel $CH_i$ 7 temporarily stores the read data into the corresponding data buffer 72. The channel control section 71 sequentially writes the read data stored in the data buffer 72 into the main memory device 2 via the data buses 11 and main memory interface section 6 in accordance with the order from the data address 16 (refer to FIG. 10) in the $CCW_1$. In this manner, the read command designated by the $CCW_1$ is executed.

Figure 11:
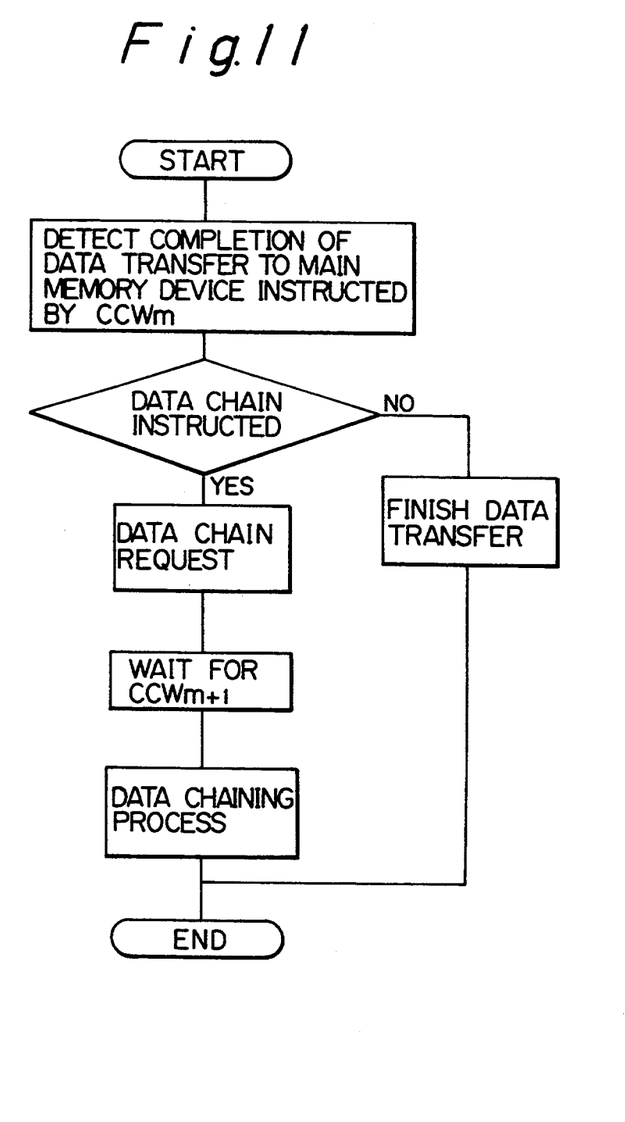
FIG. 11 is a processing flowchart for the conventional data chain.

As mentioned above, the data transfer is executed and when the data of the amount designated by the byte count 17 (refer to FIG. 10) in the $CCW_1$ has been completely transferred into the main memory device 2, the channel control section 71 of the channel $CH_i$ 7 checks the data chain flag 18 (refer to FIG. 10) in the $CCW_1$ in accordance with the processing flow of FIG. 11. If the flag 18 is set to 1, it is regarded that the data chain command has been generated. The channel control section 71 makes a request for the next $CCW_2$ to the channel processing section 5 via the control bus 12.

In response to the request, the channel processing section 5 reads out the $CCW_2$ from the CCW list 21 in the main memory device 2 via the main memory interface section 6 and returns the $CCW_2$ through the control bus 12 to the channel control section 71 which made the request.

In response to the $CCW_2$, the channel control section 71 executes the data chaining process from the $CCW_1$ to the $CCW_2$ to allow the data transfer to the main memory device 2 to be continued by using the data address 16 and byte count 17 (refer to FIG. 10) in the $CCW_2$.

FIG. 12 shows a change in the amount of data in the data buffer 72 before and after the data chain. In the diagram, upon completion of the data transfer to the main memory device 2 designated by the $CCW_1$, the data 19 to be transferred to the main memory device 2 has already been read out of the I/O apparatus 4 and stored into the data buffer 72 on the basis of the next $CCW_2$.

On the other hand, upon completion of the data chaining process from the $CCW_1$ to the $CCW_2$, in addition to the data 19, the data 20 which was read out of the I/O apparatus 4 for the period of time when the data chaining process was being executed by using the $CCW_2$ is stored. This is because during the above period of time, for the I/O apparatus 4, the data transfer to the channel $CH_i$ 7 is continued irrespective of the presence or absence of the data chain, while the data transfer to the main memory device 2 is temporarily interrupted. When the data chaining process from the $CCW_1$ to the $CCW_2$ by the channel control section 71 is finished, the data 19 and 20 (refer to FIG. 12) in the data buffer 72 are again transferred to the main memory device 2.

As mentioned above, when the execution of all of the $CCW_1$ to $CCW_n$ in the CCW list 21 has been completed, all of the input and output operations which were started by the START I/O are completed.

Since the conventional input/output channel apparatus has been constructed and controlled as mentioned above, the maximum value of the data transfer speed between the I/O channel apparatus and the main memory device must be set to a high value. If the data transfer speed does not satisfy the maximum value, problems result whereby data transfer among the channels is interfered with and a data overrun can easily occur between the I/O apparatus and the main memory device. There is also problem that such a data overrun can occur not only during the execution of the write command but also during the execution of the read command if a channel which is simultaneously executing the read command exists.

Further, since the conventional input/output channel apparatus has been constructed and controlled as mentioned above, there are problems such that if data chains simultaneously occur in a plurality of channels which are executing the read command, in which the transfer of the CCW from the channel processing section 5 to the channel control section 71 is delayed in some channels, the amount of data 19 and 20 to be stored in the data buffer of such a channel exceeds the capacity of the data buffer, so that a data overrun occurs between the channel $CH_i$ 7 and the input/output apparatus 4.

SUMMARY OF THE INVENTION

The first invention has been made to solve the problems as mentioned above and it is an object of the invention to provide an input/output channel apparatus which can prevent the occurrence of a data overrun between an input/output apparatus and a main memory device.

An object of the second invention is to provide an input/output channel apparatus which does not cause a data overrun due to a data chain during the execution of a read command.

In an input/output channel apparatus according to the first invention, an amount of data stored in a data buffer provided between a main memory device in which data is stored and an input/output apparatus for inputting and outputting data to be stored into the main memory device is determined by a data amount deciding means, and the data transfer speed is changed by a data transfer speed changing means in accordance with the amount of data which is determined by the data amount deciding means.

In an input/output channel apparatus according to the second invention, an amount of data stored in a data buffer which is provided between a main memory device in which data is stored and an input/output apparatus to input and output the data which is stored in the main memory device is determined by a data amount deciding means when a data chain command is detected after a channel has been given an instruction; priority is determined for a channel having a large amount of data by a priority deciding means on the basis of the result of the determination of the data amount deciding means, and the data chain processing speed is changed by a data chain processing speed changing means on the basis of the priority given by the priority deciding means.

The data transfer speed changing means in the first invention adjusts the data transfer speed on the basis of the data amount (the number of bytes) which is stored in the data buffer, thereby suppressing the maximum value of the whole data transfer speed which is necessary between the input/output apparatus and the main memory device to a low value while executing sufficient prefetching, decreasing interference of the data transfer among channels, and preventing data overrun between the main memory device and the input/output apparatus.

Further, the data chain processing speed changing means in the second invention discriminates the amount of data in the data buffer, decides the priority of the data chaining process on the basis of the data amount, and changes the data chain processing speed on the basis of the priority, thereby enabling the data chaining process to be executed without causing a data overrun between the main memory device and the input/output apparatus even for the data chain which simultaneously occurred in a plurality of channels.

BRIEF DESCRIPTION OF THE DRAWINGS

In the diagrams, the same parts and elements are designated by the same reference numerals.

DETAILED DESCRIPTION OF THE PREFERRED EMBODIMENTS

Figure 1:
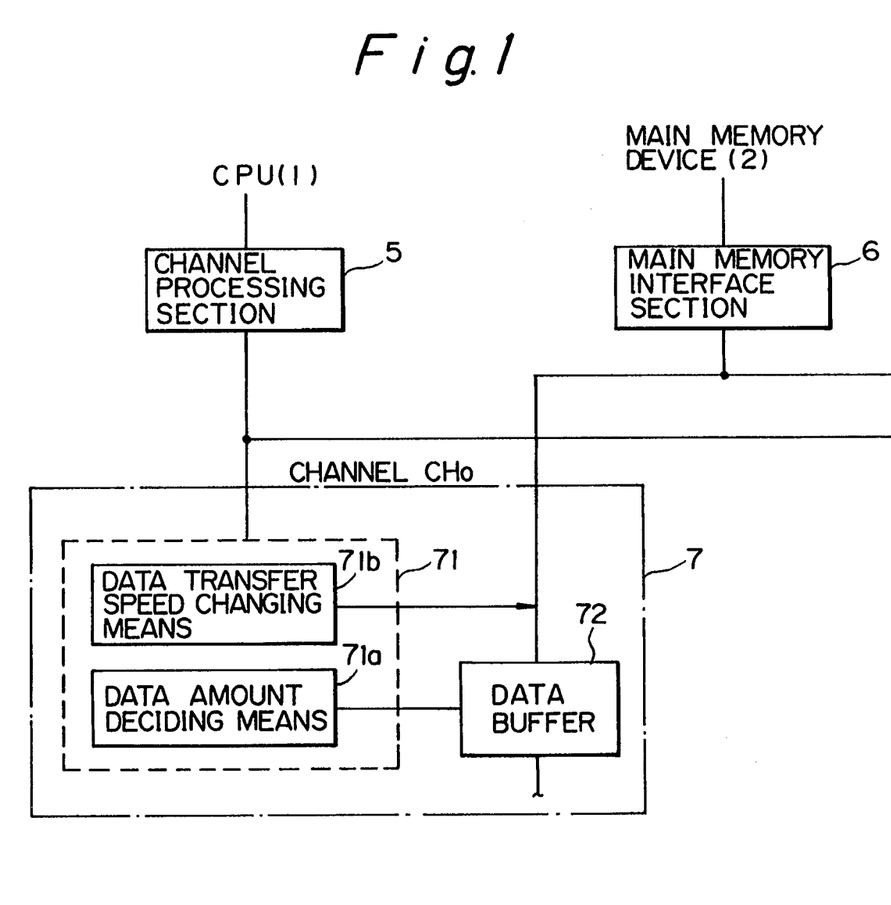
FIG. 1 is a block constructional diagram of the main section in an input/output channel apparatus according to an embodiment of the first invention.
Figure 2:
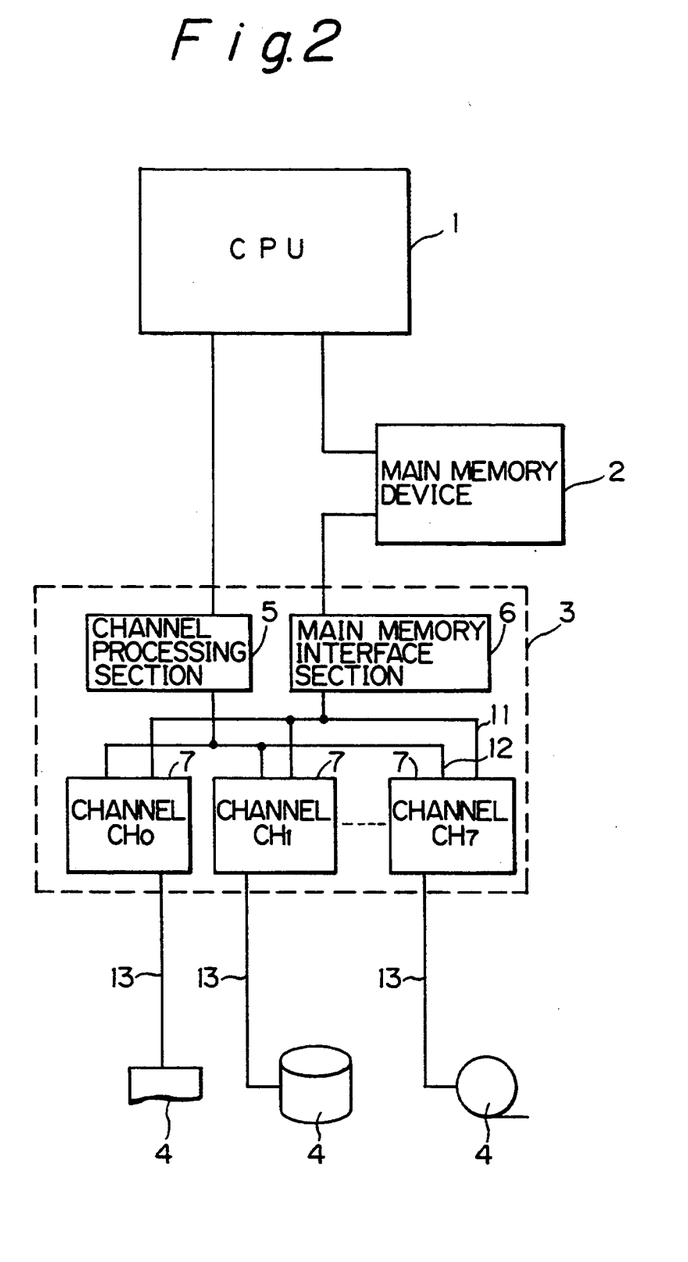
FIG. 2 is a whole schematic constructional diagram of an apparatus in the embodiment shown in FIGS. 1 and 5.
Figure 3:
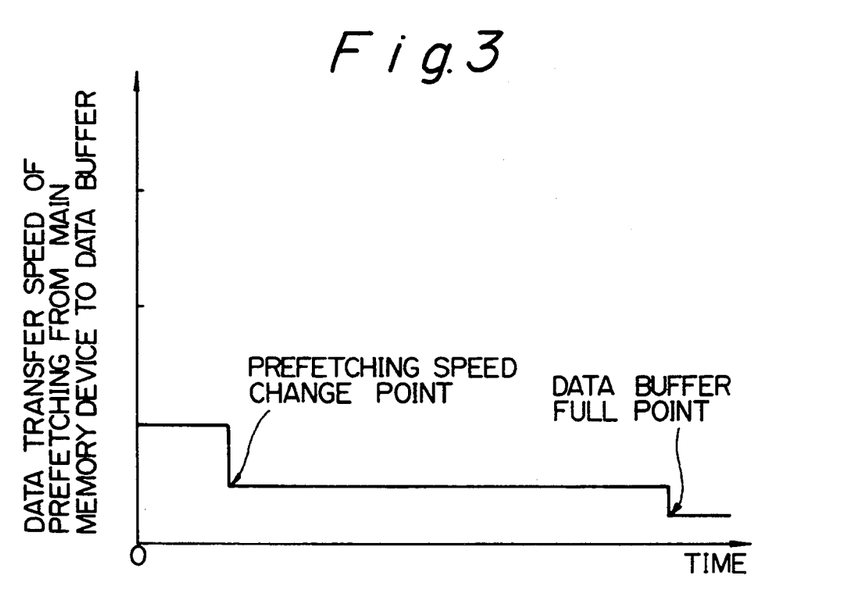
FIG. 3 is a graph showing the data transfer speed to time characteristics.
Figure 4:
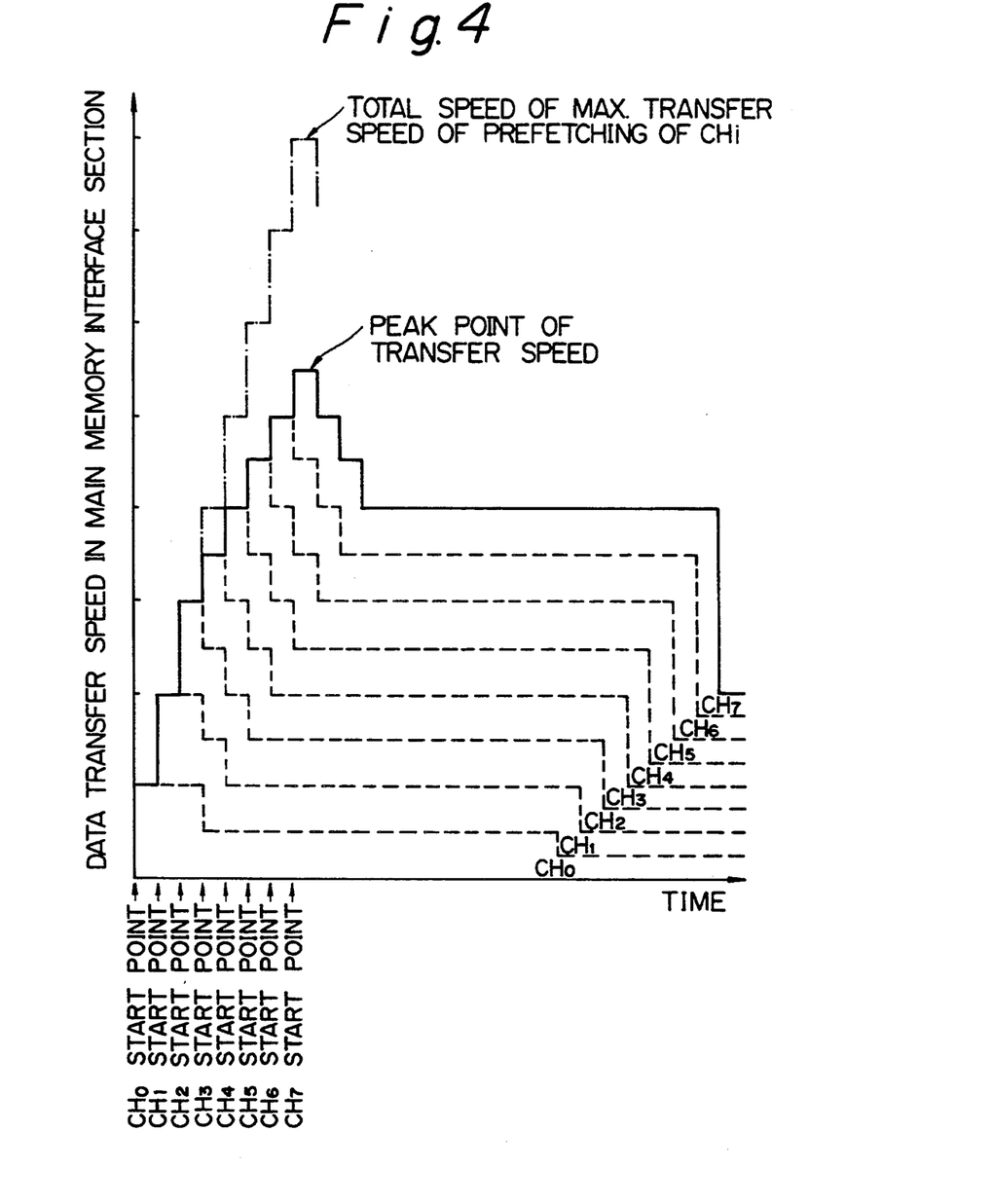
FIG. 4 is a graph showing the data transfer speed to time characteristics.

An embodiment of the first invention will be described hereinbelow with reference to FIGS. 1 to 4. FIG. 1 is a block constructional diagram showing the main section in an input/output channel apparatus according to the embodiment. FIG. 2 is a whole schematic constructional diagram of the apparatus of the embodiment. FIG. 3 is a graph showing the data transfer speed to time characteristics. FIG. 4 is a graph showing the data transfer speed to time characteristics. In the drawings, the channel control section 71 of each channel $CH_i$ 7 in the input/output channel apparatus according to the embodiment comprises: a data amount deciding section 71a and data transfer speed changing section 71b. The data amount deciding section 71a determines the data amount (the number of bytes) stored in the data buffer 72. The data transfer speed changing section 71b reduces the data transfer speed if the data amount is large and increases it when the data amount is small on the basis of the result given by the data amount deciding section 71a.

The operation of the embodiment based on the above construction will now be described.

First, when write data is prefetched, as shown in FIG. 3, the write data is prefetched from the main memory device 2 at the maximum transfer speed until enough data has been prefetched into the data buffer 72 (until a prefetch speed change point in FIG. 3). When a sufficient amount of data has been stored, the data transfer speed is reduced and the data is thereafter prefetched at a low speed until the data buffer 72 has been filled with the data. After the data buffer 72 has been filled with the data, the prefetching is continued at the same speed as the transfer speed between the data buffer 72 and the input/output apparatus 4.

When the input/output start commands are successively generated to all of the channels $CH_0$ to $CH_7$ (7) and each channel $CH_i$ 7 has prefetched the write data as shown in FIG. 3, the data transfer speed in the main memory interface section 6 may be set such that the peak point of the transfer speed is lower than the total value of the maximum transfer speeds in prefetching of the channels $CH_i$ 7 as shown in FIG. 4.

In the embodiment, as shown in FIG. 3, although the prefetching speed change point has been provided only at one position, it can also be provided at a plurality of positions to thereby smoothly reduce the data transfer speed.

Figure 5:
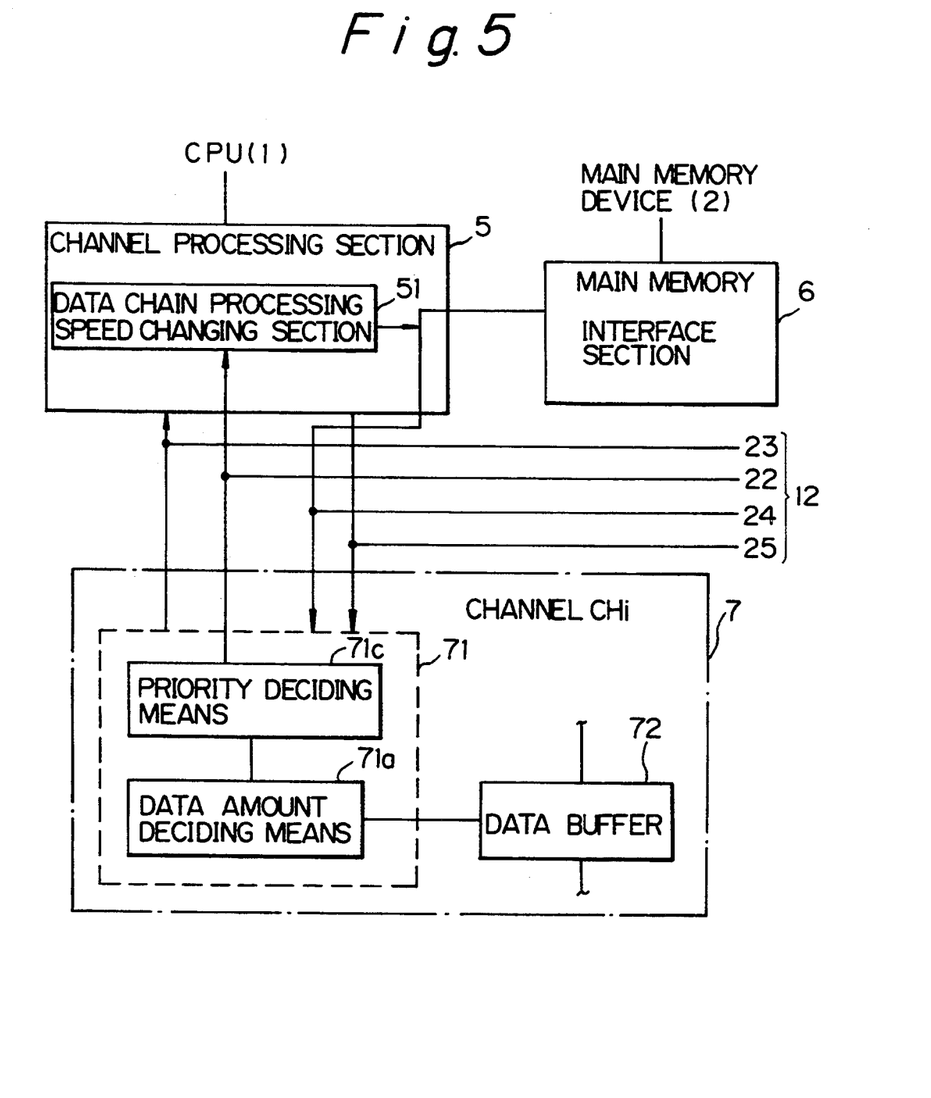
FIG. 5 is a block constructional view of the main section in an input/output channel apparatus according to an embodiment of the second invention.
Figure 6:
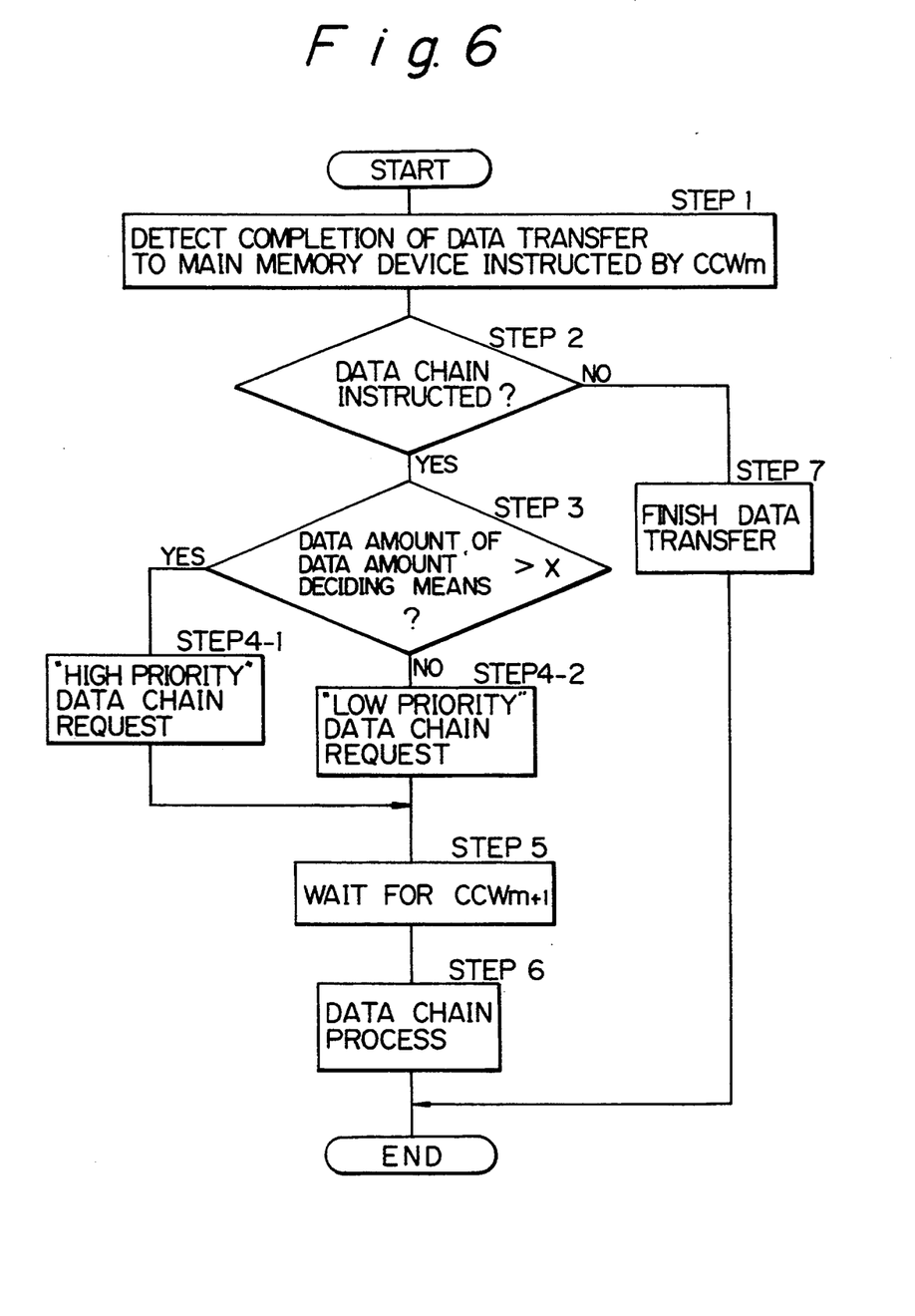
FIG. 6 is a flowchart for the data chaining process of the apparatus of the embodiment of the second invention.

A second embodiment will now be described on the basis of FIGS. 5 and 6. FIG. 5 is a block constructional diagram showing the main section in an input/output channel apparatus according to the embodiment. FIG. 6 shows an operating flowchart of the apparatus of the embodiment. In the diagrams, the channel control section 71 of each channel $CH_i$ 7 in the input/output channel apparatus according to the embodiment comprises: the data amount deciding section 71a which is constructed by, for instance, a data counter or the like for deciding the data amount (the number of bytes) stored in the data buffer 72; and priority deciding section 71c for deciding the priority of the data chaining process on the basis of the result of the decision of the data amount deciding section 71a. The channel processing section 5 has a data chain processing speed changing section 51 for changing the data chaining speed on the basis of the priority decided by the priority deciding section 71c.

The control buses 12 for connecting the channel processing section 5, main memory interface section 6, and channels $CH_i$ 7 comprise: a data chain request priority bus 22 for transmitting the priority of a data chain request from each channel $CH_i$ 7 to the channel processing section 5; a data chain request address bus 23 for transmitting addresses (0 to 7) in the channel which requested the data chain request; a data chain response CCW bus 24 for transmitting the channel command word (CCW) responsive to the data chain from the channel processing section 5 in response to the data chain request; and a data chain response address bus 25 for transmitting the address responsive to the data chain.

The operation of the apparatus in the embodiment based on the above construction will now be described. First, in a manner similar to the operation of the conventional apparatus, the $CCW_1$ is executed by the START I/O. In FIG. 6, the channel control section 71 checks to see if the data transfer to the main memory device 2 instructed by the $CCW_1$ has been completed or not (step 1). Further, the channel control section 71 checks to see if the data chain has been instructed or not by checking the data chain flag 18 in the $CCW_1$ (step 2). If the data chain has been instructed in step 2, the result of the decision of the data amount deciding section 71a is read out. If The data amount decided is larger than x bytes, a data chain operation is requested from the channel control section to be carried out by the channel processing section 5 at a "high priority" and if it is equal to or smaller than x bytes, the data chain operation is requested at a "low priority".

In FIG. 5, the prioritized data chain request is transferred to channel processing section 5 by using the data chain request bus 22 and the address (0 to 7) of the channel which made a request for the data chain is sent to the channel processing section 5 by using the data chain request address bus 23. Now, the value of x (the unit is byte) must be set such that x<(the data buffer capacity—the amount of data which is read out of the input/output apparatus and stored into the data buffer during the data chaining process).

If the data chain was simultaneously requested from a plurality of channels, the channel processing section 5 sequentially reads out the $CCW_2$ of each channel from the main memory device 2 in accordance with the order of the priorities indicated by the data chain request priority bus 22 in FIG. 5 and outputs the $CCW_2$ onto the data chain response CCW bus 24. The channel processing section 5 shows the address (0 to 7) of the channel to which the $CCW_2$ is sent onto the data chain response address bus 25 and transfers the $CCW_2$ to the channel which requested the data chain. The subsequent operations are executed in a manner similar to those in the conventional apparatus.

In the above embodiment, two values of "high priority" and "low priority" have been used for the data chain request priority. However, it is also possible to construct it in such a manner that the data amount deciding section 71a determines the data amount not only by checking whether or not it is larger than x bytes but also by conducting an examination as shown in the following Table 1 to thereby decide the gradation of priorities.

TABLE 1

| | |
|---|---|
| When $0 \leq$ the result of the data amount deciding means $< x_1$ | Lowest priority 0 |
| When $x_1 \leq$ the result of the data amount deciding means $< x_2$ | Priority 1 |
| . | . |
| . | . |
| . | . |
| When $x_k \leq$ the result of the data amount deciding means | Highest priority k |

As mentioned above, according to the first invention, since the data transfer speed for prefetching in the input/output channel has been controlled in accordance with the data amount in the data buffer, the maximum value of the necessary data transfer speed between the main memory device and the input/output apparatus can be suppressed to a low value. Thus, there are advantages such that the interference of data transfer is reduced among the channels and the data overrun between the Input/output apparatus and the main memory device is decreased.

On the other hand, according to the second invention, the data chain processing speed has been changed in accordance with the amount of data stored in the data buffer of the channel. Therefore, even if the data chain simultaneously occurred in a plurality of channels, it can be processed without causing a data overrun between the main memory device and the input/output apparatus.

What is claimed is

1. In a data processing system having a main memory device in which data is stored, an input/output apparatus for input/output of data stored in the main memory device, and a data buffer provided between the main memory device and the input/output apparatus for temporarily storing the data, an input/output channel apparatus comprising:

a data amount deciding means for deciding the amount of data stored in said data buffer during an input operation when a data chain command of a channel command word is detected;

priority deciding means for deciding the priorities for channels having a large amount of data on the basis of the result given by said data amount deciding means; and a channel processing section for obtaining a channel command word, said channel processing section including data chain processing speed changing means for changing a data chain processing speed during an input operation on the basis of the priority decided by said priority deciding means.

2. In a data processing system having a main memory device in which data is stored, an input/output apparatus for input/output of data relative to said main memory device, and a data buffer for temporarily storing data that is transferred between said main memory device and said input/output apparatus, an input/output channel apparatus comprising:

a) data quantity measuring means for deciding the amount of data stored in said data buffer when a data chain command of a channel command word is detected and producing an output indicative of the amount of data stored in the data buffer, said data quantity measuring means determining whether a large amount of data is stored in the data buffer or if a small amount of data is stored in the data buffer;

b) priority deciding means for deciding the priorities of data transfer for channels on the basis of output from said data quantity measuring means; and c) means for changing the rate of data transfer between the main memory device and the input/output apparatus during an input operation on the basis of a priority output from the priority deciding means.

3. In a data processing system having a main memory device in which data is stored, an input/output apparatus for input/output of the data relative to the main memory device and a data buffer provided between the main memory device and the input/output apparatus for temporarily storing data during a data transfer, an input/output channel apparatus comprising:

data amount deciding means for deciding the amount of data stored in said data buffer when a data chain command of a channel command word is detected;

priority deciding means for deciding the priorities for channels including threshold means for establishing a large amount of data value on the basis of the result given by said data amount deciding means; and data chain processing speed changing means including means for changing a data chain processing speed on the basis of the priority decided by said threshold means.

4. A data processing system comprising:

a main memory for storing data;

a plurality of I/O devices for transferring data to and from the main memory;

a plurality of I/O channels between I/O devices and the main memory, each of which includes a data buffer for temporarily storing data that is output from the main memory, means for determining the amount of data stored in the data buffer during an output operation, and means, responsive to the determining means, for determining relative priority of the plurality of channels; and a channel processing means for obtaining a channel command word, the channel processing means including means for changing a data chain processing speed during an input operation on the basis of the priority decided by the priority deciding means.

* * * * *